Oct. 10, 1967 J. T. HEIZER ETAL 3,346,702

ELECTRONIC SWITCHING SYSTEM UTILIZING DELAY MEANS FOR SWITCHING TRANSIENT ELIMINATION

Filed Jan. 31, 1963

INVENTORS
JOHN T. HEIZER &
FRED E. SHASHOUA

By Edward J. Norton
Attorney 3,346,702

ELECTRONIC SWITCHING SYSTEM UTILIZING DELAY MEANS FOR SWITCHING TRANSIENT ELIMINATION

John T. Heizer, Haddonfield, and Fred E. Shashoua, Cherry Hill, N.J., assignors to Radio Corporation of America, a corporation of Delaware Filed Jan. 31, 1963, Ser. No. 255,315
18 Claims. (Cl. 179—100.2)

Figure 1:
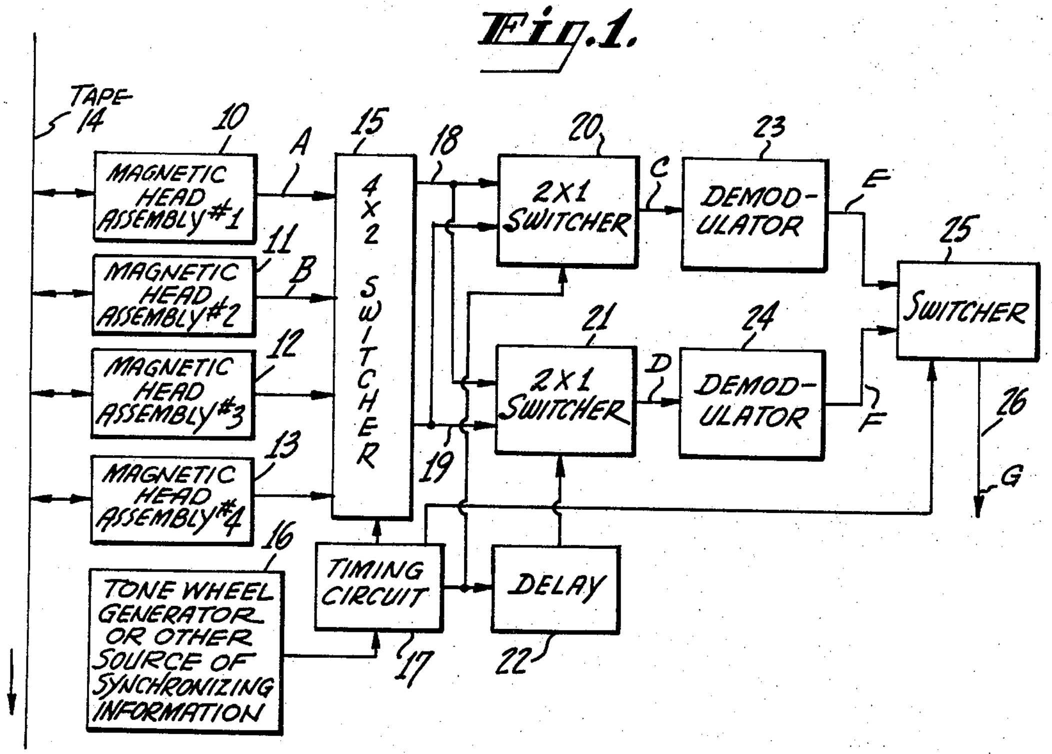

This invention relates to switching systems, and, particularly, to an improved sequential switching system for producing a continuous signal from time segments of that signal without introducing undesirable transients in the continuous signal due to switching and without blanking the continuous signal to avoid such transients.

A multi-head, transverse scan, magnetic tape recorder is one example of a system in which a signal is divided into modulated time segments and then reformed by combining the segments into a continuous, demodulated signal. A plurality of magnetic heads, usually four in number, are contained in an assembly arranged to rotate in a plane perpendicular to the direction in which the magnetic tape is driven. Each head, in turn, scans the tape in a direction transverse to the tape motion so that the head is in a recording relation with the tape during somewhat more than ninety degrees of its rotation. By simultaneously feeding the signal to be recorded as a frequency modulated signal to all four heads, the signal is recorded on successive, transverse tracks with each track being placed on the tape by a single one of the heads. A detailed discussion of this form of signal recorder may be found, for example, in a book entitled, "Video Tape Recording," by Julian Bernstein, 1960, published by J. F. Rider Publisher Inc., New York.

Other signal recorders are known in which the signal to be recorded is first divided into equal time segments with the segments then being recorded on tracks extending parallel to one another along the record medium. Such recorders usually involve the positioning of a plurality of magnetic heads in a stationary mount across the record medium with the medium being driven at right angles to the mount. The heads can be operated simultaneously or successively in a given time sequence to place parallel related tracks along the long dimension of the medium. Recorders in which cathode ray switching tubes or other electronic recording means are used in place of magnetic heads are also known.

In reproducing a signal from a record medium upon which a signal has been recorded using any one of the above techniques, the outputs from the magnetic heads or other pick-up devices are available in a sequential manner. This is true since first one magnetic head or pick-up device will reproduce the portion of the signal recorded on one track, a second magnetic head will reproduce the following portion of the signal recorded on a second track, and so on. Some form of sequential switching between the outputs of the pick-up devices is used to ensure a continuous output corresponding to the original signal recorded on the record medium.

In order to provide for such factors as bandwidth and frequency response, signal recorders of the type under discussion typically involve the recording of the signal in some form of frequency modulation. Where frequency modulation recording is used in a system which includes sequential switching between the outputs of the pick-up devices, random phase relationships introduced at the time of switching result in the presence of large transients in the reproduced signal after demodulation. Such transients are an undesirable distortion in the reproduced signal and prevent the proper operation of the equipment to which the reproduced signal is fed.

Where the signal recorder is intended to be used to record and reproduce a television signal or other synchronous signal, the switching can be timed so that the transients occur in the blanking interval in the case of a television signal or in the control period in the case of some other form of synchronous signal. The transients are removed during the usual sync removal and reinsertion procedures commonly employed to clean up the reproduced signal before application to a utilization circuit. Since the transients are timed to occur outside the message portion of the reproduced signal, the existence of the transients has little adverse effect on the message content.

In recording and reproducing a non-synchronous signal, no such convenient blanking or control interval exists. Such a signal exhibits a continuous and unbroken message content. The presence of the transients due to switching seriously distorts and otherwise renders the reproduced signal difficult to process. One technique that has been used to avoid this difficulty has been to blank the reproduced signal after demodulation for approximately two microseconds at the time of switching. In addition to the problems arising from the introduction of gaps in the reproduced signal, such a technique involves a certain loss of message content which is particularly unacceptable where cryptographic or other forms of complicated coding systems are used to convey the message. Another technique previously employed which involves the demodulation of the individual segments, followed by switching of the demodulated signals, results in a commutation phenomenon which restricts useful low frequency response.

It is an object of the invention, therefore, to provide an improved arrangement permitting sequential switching between a plurality of inputs to provide a single, continuous output without the introduction of undesirable transients due to switching in the continuous signal and without any blanking of the continuous signal to remove such transients.

Another object is to provide an improved signal recorder playback system of the type in which sequential switching is used to reproduce the recorded signal.

A further object is to provide an improved playback system for reproducing a continuous, demodulated signal from separate frequency modulated time segments of that signal recorded individually on separate tracks of a record medium.

A still further object is to provide in a multi-head magnetic recorder, which records a received non-synchronous signal as a frequency modulation signal, an improved arrangement permitting sequential switching to reproduce from the recorded signal the original signal without blanking the reproduced signal and without introducing in the reproduced signal undesirable transients resulting from the switching.

In describing an embodiment of the invention, reference will be made to the use of the invention in connection with signal recording and reproducing equipment. The invention is not limited to use in such an application but may be used wherever it is desired to provide sequential switching for forming a single, continuous, demodulated signal from a plurality of modulated signal intervals supplied in some sort of time sequence. It is not necessary to the construction or operation of the invention that the sources be the signal pick-up devices of a recorder.

Briefly, it will be assumed that a four-head, transverse scan magnetic signal recorder and reproducer is provided. The signal received by the recorder is recorded as a frequency modulated signal which is divided into time segments individually recorded by the magnetic heads on separate transverse tracks of the magnetic tape. In the reproduction of the recorded signal, first and second switching means are provided for combining the frequency modulated signal intervals reproduced by the four heads into a first and second continuous frequency modulated signal. The switching time of one of the switching means is delayed a given time interval with respect to that of the other switching means. The two continuous frequency modulated signal are then individually applied to separate but substantially identical frequency demodulators. Identical signals appear at the outputs of the two demodulators except that transients in one of the signals resulting from random phase relationships introduced in the signal due to switching are displaced in time with respect to the transients in the second signal.

The demodulated signals are applied to an output switcher. The output switcher is in the form of a pair of gates which are selectively operated to pass one or the other of the two demodulated signals to a single output. The output switcher is operated to pass the first demodulated signal including the delayed transients to the output. At a time before the transient occurs in the first demodulated signal then being passed and after the transient occurs in the second demodulated signal including the undelayed transient, the output switcher acts to block the first demodulated signal and to pass the second demodulated signal to the output. At a time after the transient occurs again in the second demodulated signal, the output switcher acts to block the second demodulated signal and to again pass the first demodulated signal to the output.

The output switcher is a low transient switch and is A.C. (alternating current) coupled to permit independent balancing of the gates for minimum transient. Since the inputs to the gates of the output switcher are continuous and of identical message content resulting in both gates operating at substantially the same D.C. (direct current) or average potential, the gates corresponding to the two halves of the output switcher can be readily balanced by proper biasing to provide a minimum shift in the D.C. potential at the time the output switcher switches between the two inputs. A continuous, demodulated signal is produced by the output switcher in which transients otherwise introduced by the sequential switching are effectively removed.

Figure 2:
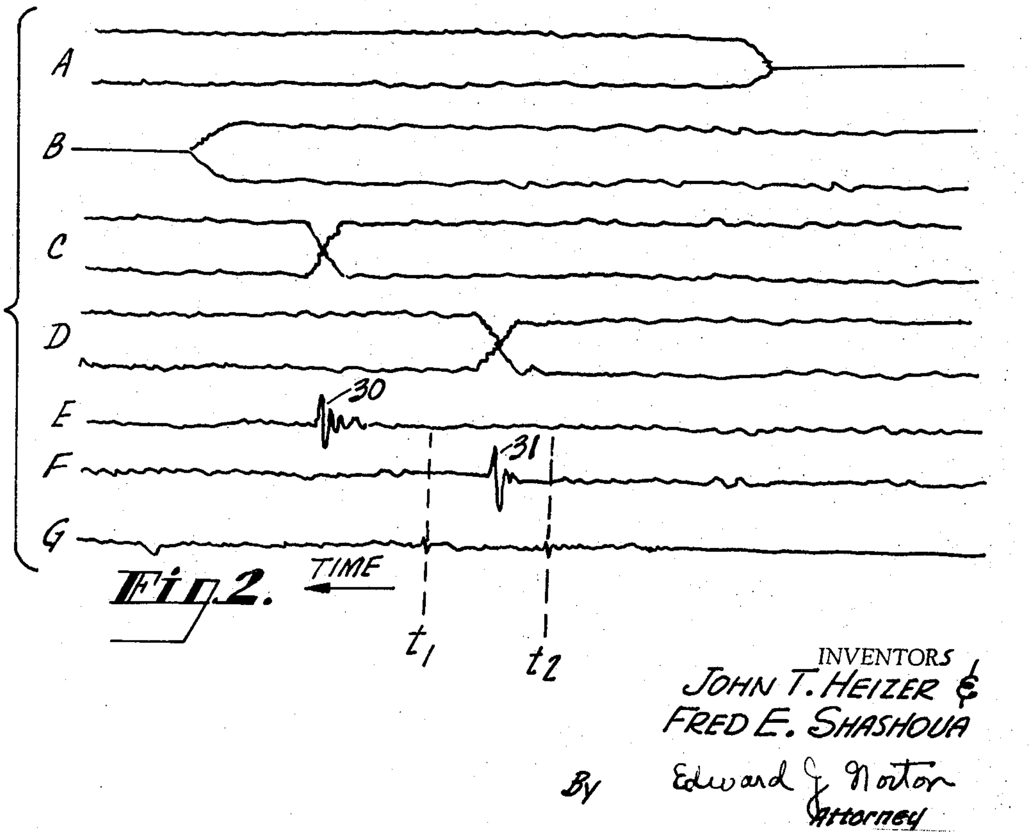

The invention will now be described in greater detail by reference to the following description taken in connection with the accompanying drawing, in which:

FIG. 1 is a block diagram of one embodiment constructed according to the invention, and FIG. 2 is a series of waveforms useful in describing the operation of the embodiment shown in FIG. 1.

While no ground symbols or return paths between the blocks have been shown in FIG. 1 in order to simplify the drawing, this structure is to be understood as included in the circuit arrangement shown in a known manner.

FIG. 1 shows an embodiment where the invention is used with a multi-head, transverse scan magnetic recorder-reproducer. As noted above, the invention is not limited to use in such an application but can be used wherever it is desired to produce a continuous signal from a plurality of signal intervals.

Four magnetic head assemblies 10 through 13 are shown which function to record a signal on and reproduce the signal from a magnetic tape 14. The magnetic heads included in the assemblies 10 through 13 are spaced 90 degrees apart about the periphery of a wheel which rotates in a plane perpendicular to the direction of tape movement indicated by the arrow. It is assumed that a non-synchronous data signal as might be produced by radar, telemetry or other data processing equipment has been simultaneously applied to the head assemblies 10 through 13. The head assemblies 10 through 13 operate to record the received data signal on successive transverse tracks along the tape 14. Head assembly No. 1, block 10, records a portion of the received signal on a first transverse track. Head assembly No. 2, block 11, records the following portion of the received signal on the next transverse track, and so on. A detailed description of the operation and construction of the tape driving means and the magnetic head assembly is given in the above-mentioned book by Julian Bernstein and elsewhere in the literature. Since this structure, in itself, forms no part of the present invention, it has not been shown in detail.

In reproducing the recorded signal from the tape 14, a frequency modulated signal interval will appear at the output of head assembly No. 1 followed in turn by the appearance of frequency modulated signal intervals at the outputs of head assemblies Nos. 2, 3 and 4. This cycle is repeated as the tape 14 is driven past the head assemblies 10 through 13 so that a frequency modulated signal interval appears at the output of first one and then another of the head assemblies. The frequency modulated signal intervals produced at the outputs of the head assemblies 10 through 13 are fed to a 4 x 2 switcher 15.

In order to properly synchronize the recording and reproduction of the signal from the tape 14, a tone wheel generator 16 is typically used. The tone wheel generator 16, which may be constructed in the manner outlined in the referenced book by Julian Bernstein, is included with the head assemblies 10 through 13 and produces a pulse at least once each complete revolution of the head assemblies. Since the time at which the pulse is produced in each revolution of the head assemblies is always the same, the pulse provides information as to when one head is leaving the tape 14 and the next head is beginning its scan. The pulse output of the tone wheel generator 16 is applied to a timing circuit 17 to properly synchronize the timing information provided by the timing circuit 17. Sources of synchronizing information other than a tone wheel generator may be used. For example, a control signal can be added to the signal recorded on tape 14 using some type of sub-carrier technique so that the presence of the control signal in no way distorts or otherwise affects the message content of the recorded signal. Suitable means can be provided for recovering the control signal from the reproduced signal and for applying the recovered control signal to the timing circuit 17 to synchronize the timing information supplied thereby.

The 4 x 2 switcher 15 operates in response to the timing information applied thereto from the timing circuit 17 to cause the frequency modulated signal intervals received from head assemblies Nos. 1 and 3, blocks 10 and 12, to appear on lead 18. The frequency modulated signal intervals received from head assemblies Nos. 2 and 4, blocks 11 and 13, appear on lead 19. The two output signals of the 4 x 2 switcher 15 are applied to a first 2 x 1 switcher 20 and to a second 2 x 1 switcher 21. The 2 x 1 switchers 20 and 21 are of identical construction and operation. Timing pulses produced by the timing circuit 17 are fed directly to the 2 x 1 switcher 20 and through a delay 22 to the 2 x 1 switcher 21.

As discussed in the above-mentioned book by Julian Bernstein, the frequency modulated signal intervals produced by the head assemblies 10 through 13 overlap due to the magnetic heads being in contact with the tape 14 for more than 90 degrees of their rotation. That is, the frequency modulated signal interval produced by one head assembly ends after the frequency modulated signal interval produced by the next head assembly begins. The same portion of the signal appearing at the end of one frequency modulated signal interval occurs at the beginning of the frequency modulated signal interval produced by the next head assembly.

The 2 x 1 switcher 20 operates in response to the timing information applied thereto from the timing circuit 17 to combine the frequency modulated signal intervals received via leads 18 and 19 into a single, continuous frequency modulated signal which is applied to a frequency demodulator 23. For example, at some time before the end of the frequency modulated signal interval produced by head assembly No. 1, block 10, received over lead 18 and after the frequency modulated signal interval produced by head assembly No. 2, block 11, and received over lead 19 has begun, the 2 x 1 switcher 20 operates to switch the output from the signal input received over lead 18 to that received over lead 19. This operation continues in timed relation with the order in which the frequency modulated signal intervals appear at the outputs of the head assemblies 10 through 13. Because the signal intervals overlap, the output of the 2 x 1 switcher 20 is a continuous, frequency modulated signal substantially identical to that originally applied to the head assemblies 10 through 13 for recording on the tape 14. Since the 2 x 1 switcher 20 is acting to switch between dissimilar frequency modulated signals, random phase relationships are introduced into the continuous output signal at the time of switching.

The 2 x 1 switcher 21 operates in exactly the same manner as the 2 x 1 switcher 20 to produce a continuous frequency modulated signal in response to the frequency modulated signal intervals received over leads 18 and 19, except that the switching time of the 2 x 1 switcher 21 is delayed with respect to that of the 2 x 1 switcher 20 by delaying in delay 22 the timing information applied to the 2 x 1 switcher 21 from the timing circuit 17. Random phase relationships introduced in the continuous frequency modulated signal at the output of the 2 x 1 switcher 21 due to switching occur at a time after that at which the random phase relationships occur in the output signal of the 2 x 1 switcher 20. The continuous frequency modulated signal appearing at the output of the 2 x 1 switcher 21 is applied to a frequency demodulator 24 identical to the demodulator 23.

By way of example, the construction and operation of the 4 x 2 switcher 15 can be substantially identical to the corresponding structure shown and described in United States Patent No. 2,979,562, issued Apr. 11, 1961, to E. M. Leyton for "Switching System for Transverse Scanning Tape Reproducer." This reference also describes a 2 x 1 switcher which can be used for the 2 x 1 switchers 20 and 21. The timing circuit 17 can be any suitable arrangement designed to supply predetermined timing information in the form of control pulses or signals. The demodulators 23 and 24 may be any suitable frequency demodulator available in the art. A delay line demodulator which could be used for the demodulators 23 and 24 is described on page 166 of the above book by Julian Bernstein.

The demodulators 23 and 24 serve to recover the original signal from the received frequency modulated signals. The demodulators 23 and 24 being responsive to any phase or frequency variations in the signals received thereby will produce in their output signals a large transient in response to the random phase relationships introduced by the switching action of the 2 x 1 switchers 20 and 21. The output signal of demodulator 23 is identical to the output of demodulator 24, except that the switching transients in the output signal of demodulator 24 occur in each case after the switching transients in the output signal of demodulator 23. The continuous demodulated signals appearing at the outputs of demodulators 23 and 24 are applied to a low transient output switcher 25. It is to be noted that since the inputs to demodulators 23 and 24 are both continuous and of identical message content, the fact that practical demodulators are typically A.C. coupled and therefore have restricted low frequency response does not act to introduce distortion in the demodulated signals such as would be the case if intermittent, dissimilar signals were applied to the demodulators.

The output switcher 25 may be of any type capable of selectively switching a plurality of inputs to a single output 26, while providing a minimum jump or discontinuity in the output signal at the switching time. One example is an arrangement using a pair of crystal diode bridge configurations. A bistable circuit is connected to the diode bridges so that, when the bistable circuit is in one stable state, one of the diode bridges passes a signal applied thereto while the other diode bridge blocks a signal applied thereto. When the bistable circuit is made to assume its other stable state, the condition of the diode bridges is reversed. By properly biasing the diodes in the presence of continuous signals applied thereto, the diode bridges or gates can be balanced to a point where little or no discontinuity is introduced in the output signal by the switching action.

The output switcher 25 which may be constructed in the manner outlined above operates in response to timing information applied thereto from the timing circuit 17 to apply the output signal of demodulator 24 to its output 26. At some time determined by the timing information before the delayed switching transient occurs in the output signal of demodulator 24 and after the undelayed switching transient has occurred in the output signal of demodulator 23, the output switcher 25 blocks the signal received from demodulator 24 and passes the signal received from demodulator 23. The output switcher 25 at a time determined by the timing information, after the delayed transient has occurred in the output signal of demodulator 24 and before the next undelayed transient occurs in the output signal of demodulator 23, switches so that only the output signal of demodulator 24 is again passed to the switcher output 26.

Since the two inputs to the output switcher 25 are both continuous and of identical message content, it is possible to A.C. couple the halves of the switcher 25 to the outputs of demodulators 23 and 24. This permits independent balancing of the halves or gates in the switcher 25 by the usual biasing means to provide a minimum shift or jump in the output signal of the switcher 25 at the switching time. The D.C. potential or average level of both input signals to the output switcher 25 is the same. As a result, little or no shift in the D.C. potential of the output signal from the switcher 25 due to switching between the input signals occurs. The D.C. level of the output signal on lead 26 is maintained at that of both input signals received by the switcher 25. Since no change or shift in the D.C. level occurs upon switching between the input signals, no switching transients are introduced by the switching action. It has been found that some signal loss will occur in the output signal of switcher 25 at the switching time but such loss is of a negligible amount not affecting the operation of utilization circuits to which the signal is fed. Any distortion introduced in the output signal on lead 26 by the operation of switcher 25 is considerably below the noise level and presents no operational difficulties. The output switcher 25 functions to produce a continuous, demodulated signal corresponding to the non-synchronous signal originally fed to head assemblies 10 through 13 for recording on the tape 14. There is no blanking of the signal and the signal is free of any large transients which would disrupt and otherwise interfere with the operation of equipment to which the reproduced signal is fed.

The operation of the sequential switching system may be more clearly understood by reference to the waveforms given in FIG. 2. Waveform A represents a frequency modulated signal interval from head assembly 1, block 10. Waveform B represents the following frequency modulated signal interval from head assembly 2, block 11. Waveform C represents the combined output signal of the 2 x 1 switcher 20, while waveform D represents the combined output signal of the 2 x 1 switcher 21. The manner in which the random phase relationships are introduced into the waveforms C and D by the operation of 2 x 1 switchers 20 and 21 is indicated. The phase distortion present in waveform D is displaced in time with respect to that present in waveform C.

Waveform E is the demodulated output signal of demodulator 23 including a large transient 30 resulting from the phase distortion present in the received signal. The output of demodulator 24 is shown in waveform F and includes the large transient 31. The output signal of switcher 25 is given in waveform G. In the example given in the waveforms of FIG. 2, the switcher 25 is shown as first passing the output of demodulator 24, waveform F, to its output, waveform G. At time $t_1$, which occurs between transients 30 and 31, switcher 25 switches so as to pass the output of demodulator 23, waveform E. At time $t_2$ which occurs after transient 31 and before the appearance of the next transient in waveform E, the switcher 25 switches to pass only the output of demodulator 24, waveform F. The negligible signal loss which occurs at times $t_1$ and $t_2$ in the output signal of switcher 25 is represented in waveform G by slight discontinuities in the signal.

Considering waveforms E, F and G of FIG. 2, it is seen that the amount of delay imparted to the timing information applied to the 2 x 1 switcher 21 must be determined at least in part according to the decay time of the demodulators 23 and 24 or, in other words, the time required for the demodulator output signal to return to its normal level after the occurrence of a transient therein. Transient 31, waveform F, must be delayed enough so that sufficient time exists between the beginning of transient 31 and the end of transient 30 for the switcher 25 to complete its switching action at time $t_1$. Both output signals from demodulators 23 and 24 should be at their normal levels when the switching takes place. However, transient 31 can not be delayed beyond the point at which the overlap of the received signal intervals, waveforms A and B, ends. The amount of delay actually employed can be determined according to the characteristics and needs of the particular application. Since the transient decay time of demodulators now available is less than 0.2 microsecond, it has been found that in a typical application a delay of 0.4 to 0.5 microsecond between the switching times of the 2 x 1 switchers 20 and 21 is adequate to ensure proper operation.

In describing the embodiment shown in FIG. 1, reference has been made to a separate delay 22. The 2 x 1 switcher 21 can include various circuits having controllable time constants. The delayed switching time can be built into the 2 x 1 switcher 21, eliminating the need for the separate delay 22.

Ideally, the demodulators 23 and 24 should be perfectly matched so that their output signals are, in fact, identical except for the difference in the time of the switching transients. As a practical matter such a condition is difficult to achieve. The response of one of the demodulators 23 or 24 is likely to differ slightly from the other. The outputs from the two halves or gates of the switcher 25 can be adjusted to have a duty cycle which minimizes the effect on the output signal, lead 26, due to mismatch between the demodulators 23 and 24.

In the example shown in waveforms E, F and G of FIG. 2, it is seen that the period during which waveform E is passed to the output is only a fraction of that during which waveform F is passed to the output by the switcher 25. In a practical case, the time between switching cycles may be 1000 microseconds with the time between $t_1$ and $t_2$ equalling 5 microseconds. The respective outputs from the two halves or gates in the switcher 25 have a duty cycle of 99.5 percent and 0.5 percent. Since the output of demodulator 23 in the example given is switched to the output of switcher 24 for a relatively short time, any effect of mismatch between the demodulators 23 and 24 on the output signal of the switcher 25 is minimized. It is possible by controlling the timing information applied to the switcher 25 from the timing circuit 17 to determine the proper duty cycles for providing the best output signal from the switcher 25 according to the characteristics and requirements of a particular application.

Instead of using a 4 x 2 switcher 15 and two 2 x 1 switchers 20 and 21 in the manner shown in FIG. 1, a system employing two 4 x 1 switchers may be used. Each 4 x 1 switcher serves to combine the four outputs from head assemblies 10 through 13 into a single, continuous frequency modulated signal. The switching time of one of the 4 x 1 switchers is delayed with respect to that of the other in the manner discussed above. The output of one 4 x 1 switcher is fed to the input of one of the demodulators 23 or 24 with the output of the second 4 x 1 switcher being fed to the input of the other demodulator. The operation otherwise remains as described.

Reference has been made to the use of the invention in processing non-synchronous signals of the type including continuous message content. The invention may be used as well with desirable results in systems processing synchronous signals, for example, television signals. By removing the switching transients timed to occur in the blanking intervals, the demands placed on the circuits for removing and reinserting the blanking intervals is reduced. The overall performance of the system is improved.

What is claimed is:

1. In combination, input means adapted to receive a plurality of input signals timing means, switching means for combining said plurality of input signals into a first continuous signal and with said timing means to produce a second continuous signal which is substantially identical to said first signal in information content except that any switching distortion in said first signal is displaced in time with respect to said switching distortion in said second signal by the action of said timing means, and means for combining said first and second signals into a single, continuous output signal substantially free of said distortion.

2. In combination, input means adapted to receive a plurality of frequency modulated input signals, timing means, switching means for combining said plurality of input signals into a first continuous frequency modulated signal and with said timing means to produce a second continuous frequency modulated signal which is substantially identical to said first signal in information content except that any switching distortion in said first signal is displaced in time with respect to said switching distortion in said second signal by the action of said timing means, and means for combining said first and second signals into a single, continuous demodulated output signal free of said distortion.

3. In combination, input means adapted to receive a plurality of frequency modulated input signals, timing means, switching means for combining said plurality of input signals into a first continuous frequency modulated signal and with said timing means to produce a second continuous frequency modulated signal which is substantially identical to said first signal in information content except that any switching distortion in said first signal is displaced in time with respect to said switching distortion in said second signal by the action of said timing means, means for separately demodulating said first and second continuous signals, and a second switching means coupled to said demodulating means for combining the first and second demodulated signals into a single, continuous demodulated output signal free of said distortion.

4. In combination, input means adapted to receive a plurality of input signals, first switching means for combining said plurality of input signals into a continuous signal, second switching means including a time delay circuit having a switching time different from that of said first switching means for combining said plurality of input signals into a second continuous signal of the same information content except that any distortion in said first continuous signal due to the switching of said first switching means is displaced in time by the action of said time delay circuit with respect to any distortion in said second continuous signal due to the switching of said second switching means, and a third switching means for combining said first and second continuous signals into a single continuous output signal free of said distortions.

5. In combination, input means adapted to receive a plurality of sequentially occurring frequency modulated input signals, first switching means for combining said plurality of input signals into a continuous frequency modulated signal, second switching means including a time delay circuit having a switching time different from that of said first switching means for combining said plurality of input signals into a second continuous frequency modulated signal of the same information content except that any phase distortion in said first continuous signal due to the switching of said first switching means is displaced in time by the action of said time delay circuit with respect to any phase distortion in said second continuous signal due to the switching of said second switching means, and means including a third switching means for combining said first and second continuous signals into a single continuous demodulated output signal free of said distortions.

6. In combination, means for generating in time sequence a plurality of different frequency modulated signals and for applying said signals to separate outputs, first switching means coupled to said outputs for combining said plurality of signals into a continuous frequency modulated signal, second switching means including a time delay circuit coupled to said outputs having a switching time different from that of said first switching means for combining said plurality of signals into a second continuous frequency modulated signal of the same information content except that any distortion in said first continuous signal due to the switching of said first switching means is displaced in time by the action of said time delay circuit with respect to any distortion in said second continuous signal due to the switching of said second switching means, means for separately demodulating said first and second continuous signals, and a third switching means coupled to said demodulating means for combining said first and second demodulated signals into a single continuous demodulated output signal free of said distortions.

7. A sequential switching system for forming a continuous signal from a plurality of signals occurring in time sequence and corresponding to different intervals of said continuous signal comprising, in combination, timing means, switching means for combining said plurality of signals into a first continuous signal and with said timing means to produce a second continuous signal which is substantially identical to said first signal in information content except that any switching distortion in said first signal is displaced in time with respect to said switching distortion in said second signal by the action of said timing means, and means including a second switching means for combining said first and second continuous signals into a single continuous output signal unaffected by said distortions.

8. In a system of the type in which a message signal is divided into a plurality of frequency modulated signals corresponding to separate intervals thereof, a switching system for forming said message signal from said plurality of signals comprising, in combination, first switching means for combining said plurality of signals into a continuous frequency modulated signal, second switching means including a time delay circuit having a switching time different from that of said first switching means for combining said plurality of signals into a second continuous frequency modulated signal of the same information content except that any random phase relationships in said first continuous signal due to the switching of said first switching means is displaced in time by the action of said time delay circuit with respect to any random phase relationships in said second continuous signal due to the switching of said second switching means, a first frequency demodulator for demodulating said first continuous signal, a second frequency demodulator for demodulating said second continuous signal, and a third switching means coupled to said first and second demodulators for combining the first and second demodulated output signals of said demodulators into said message signal unaffected by said random phase relationships.

9. In combination, a first source of frequency modulated signals occurring at regularly spaced intervals, a second source of frequency modulated signals occurring at regularly spaced intervals interspaced in time between the signals supplied by said first source so that the signals supplied by said first and second sources overlap, first and second switching means each coupled to both said first and said second source, timing means coupled to said first and second switching means for operating said first switching means to combine the signals supplied by said first and second sources into a continuous frequency modulated signal with the switching by said first switching means being timed to occur during said overlap, said timing means being arranged to operate said second switching means to combine the signals supplied by said first and second sources into a second continuous frequency modulated signal with the switching by said second switching means being timed to occur at a different time during said overlap, said first and second continuous signals being substantially identical except that random phase relationships introduced in said first continuous signal due to the switching of said first switching means are displaced in time with respect to random phase relationships introduced in said second continuous signal due to the switching of said second switching means, and means including a third switching means coupled to said first and second switching means for combining said first and second continuous signals into a continuous demodulated signal unaffected by said random phase relationships.

10. In combination, a first source of frequency modulated signals occurring at regularly spaced intervals, a second source of frequency modulated signals occurring at regularly spaced intervals interspaced in time between the signals supplied by said first source so that the signals supplied by said first and second sources overlap, first and second switching means each coupled to both said first and said second source, timing means coupled to said first and second switching means for operating said first switching means to combine the signals supplied by said first and second sources into a continuous frequency modulated signal with the switching by said first switching means being timed to occur during said overlap, said timing means being arranged to operate said second switching means to combine the signals supplied by said first and second sources into a second continuous frequency modulated signal with the switching by said second switching means being timed to occur at a different time during said overlap, a first frequency demodulator coupled to said first switching means for translating said first continuous signal into a first demodulated signal, a second frequency demodulator coupled to said second switching means for translating said second continuous signal into a second demodulated signal, said first and second demodulated signals being substantially identical except that transients in said first demodulated signal due to random phase relationships introduced by the switching of said first switching means are displaced in time with respect to transients in said second demodulated signal due to random phase relationships introduced by the switching of said second switching means, and a third switching means coupled to said demodulators for combining said first and second demodulated signals into a single continuous output signal in which said transients are removed.

11. In combination, a first source of frequency modulated signals occurring at regularly spaced intervals, a second source of frequency modulated signals occurring at regularly spaced intervals interspaced in time between the signals supplied by said first source so that the signals supplied by said first and second sources overlap, first and second switching means each coupled to both said first and said second source, timing means coupled to said first and second switching means for operating said first switching means to combine the signals supplied by said first and second sources into a continuous frequency modulated signal with the switching by said first switching means being timed to occur during said overlap, said timing means being arranged to operate said second switching means to combine the signals supplied by said first and second sources into a second continuous frequency modulated signal with the switching by said second switching means being delayed to occur at a different time than that of said first switching means during said overlap, a first frequency demodulator coupled to said first switching means for translating said first continuous signal into a first demodulated signal, a second frequency demodulator coupled to said second switching means for translating said second continuous signal into a second demodulated signal, said first and second demodulated signals being substantially identical except that transients in said second demodulated signal due to random phase relationships introduced by the switching of said second switching means are delay in time with respect to transients in said first demodulated signal due to random phase relationships introduced by the switching of said first switching means, a third switching means coupled to said demodulators and to said timing means, said third switching means being operated by said timing means to pass to an output only said second demodulated signal until after the occurrence of a transient in said first demodulated signal and before the occurrence of the next transient in said second demodulated signal at which time said third switching means is operated to pass only said first demodulated signal to said output, said third switching means being thereafter operated by said timing means to pass only said first demodulated signal until after the occurrence of said next transient in said second demodulated signal and before the occurrence of the next transient in said first demodulated signal at which time said third switching means is operated to pass only said second demodulated signal to said output, whereby said third switching means is operated to produce a continuous demodulated output signal free of said transients.

12. In a signal recording and reproducing system of the type in which a message signal is divided into a plurality of frequency modulated signals corresponding to separate intervals of said message signal with said plurality of signals being recorded individually on separate tracks of a record medium in a given time sequence, said system including means for reproducing said plurality of signals from said record medium, a switching system for forming said message signal from said plurality of signals comprising, in combination, timing means, switching means coupled to said reproducing means for combining said plurality of signals into a first continuous frequency modulated signal and with said timing means to produce a second continuous frequency modulated signal which is substantially identical to said first signal in information content except that any switching distortion in said first signal is displaced in time with respect to said switching distortion in said second signal by the action of said timing means, and means including a second switching means for combining said first and second continuous signals into a single continuous output signal unaffected by said distortions.

13. In combination, signal recording and reproducing means responsive to a message signal for dividing said message signal into a plurality of overlapping frequency modulated signals individually recorded on separate tracks of a record medium in a given time sequence.

said signal recording and reproducing means including a plurality of output terminals and being arranged to reproduce said plurality of signals from said record medium so that said plurality of signals appear at said output terminals in said given time sequence, first switching means coupled to said output terminals for combining said plurality of signals into a continuous frequency modulated signal, second switching means including a time delay circuit coupled to said output terminals and having a switching time different from that of said first switching means for combining said plurality of signals into a second continuous frequency modulated signal of the same information content except that any random phase relationships in said first continuous signal due to the switching of said first switching means is displaced in time by the action of said time delay circuit with respect to any random phase relationships in said second continuous signal due to the switching of said second switching means, a first frequency demodulator for demodulating said first continuous signal, a second frequency demodulator for demodulating said second continuous signal, and a third switching means coupled to said first and second demodulators for combining the first and second demodulated output signals of said demodulators into said message signal unaffected by said random phase relationships.

14. In combination, signal recording and reproducing means responsive to a message signal for dividing said message signal into a plurality of overlapping frequency modulated signals individually recorded on separate tracks of a record medium in a given time sequence, said signal recording and reproducing means including a plurality of output terminals and being arranged to reproduce said plurality of signals from said medium so that said plurality of signals appear at said output terminals in said given time sequence,
first and second switching means each coupled to said output terminals,
timing means coupled to said first and second switching means for operating said first switching means to combine said plurality of signals into a continuous frequency modulated signal with the switching by said first switching means being timed to occur during said overlap,
said timing means being arranged to operate said second switching means to combine said plurality of signals into a second continuous frequency modulated signal with the switching of said second switching means being delayed to occur during said overlap at a time later than that of said first switching means,
a first frequency demodulator coupled to said first switching means for translating said first continuous signal into a first demodulated signal,
a second frequency demodulator coupled to said second switching means for translating said second continuous signal into a second demodulated signal,
said first and second demodulated signals being substantially identical except that transients in said second demodulated signal due to random phase relationships introduced by the switching of said second switching means are delayed in time with respect to transients in said first demodulated signal due to random phase relationships introduced by the switching of said first switching means,
a third switching means coupled to said demodulators and to said timing means,
said third switching means being operated by said timing means to pass to an output only said second demodulated signal until after the occurrence of a transient in said first demodulated signal and before the occurrence of the next transient in said second demodulated signal at which time said third switching means is operated to pass only said first demodulated signal to said output,
said third switching means being thereafter operated by said timing means to pass only said first demodulated signal until after the occurrence of said next transient in said second demodulated signal and before the occurrence of the next transient in said first demodulated signal at which time said third switching means is operated to pass only said second demodulated signal to said output,
whereby said third switching means is operated to produce at said last-mentioned output said message signal unaffected by said transients.

15. In combination,
first, second, third, and fourth sources each arranged to supply frequency modulated signals substantially of equal length and occurring at regularly spaced intervals,
each signal supplied by said first source beginning after the end of signals supplied by said second and third sources and before the end of a signal supplied by said fourth source,
each signal supplied by said second source beginning after the end of signals supplied by said third and fourth sources and before the end of a signal supplied by said first source,
each signal supplied by said third source beginning after the end of signals supplied by said fourth and first sources and before the end of a signal supplied by said second source,
each signal supplied by said fourth source beginning after the end of signals supplied by said first and second sources and before the end of a signal supplied by said third source,
whereby said frequency modulated signals are sequentially supplied by said sources in time overlapping relationship,
a 4 x 2 switcher coupled to said sources for providing a first output signal including only the signals supplied by said first and third sources and a second output signal including only the signals supplied by said second and fourth sources,
a first 2 x 1 switcher coupled to said 4 x 2 switcher for combining said first and second output signals into a continuous frequency modulated signal with the switching of said first 2 x 1 switcher being timed to occur during said overlaps.
a second 2 x 1 switcher coupled to said 4 x 2 switcher for combining said first and second output signals into a second continuous frequency modulated signal with the switching of said second 2 x 1 switcher being delayed to occur during said overlaps at a different time than that of said first 2 x 1 switcher,
said first and second continuous signals being substantially identical except that random phase relationships introduced in said first continuous signal due to the switching of said first 2 x 1 switcher are displaced in time with respect to random phase relationships introduced in said second continuous signal due to the switching of said second 2 x 1 switcher,
and means including an output switching means for combining said first and second continuous sigals into a single continuous demodulated signal unaffected by said random phase relationships.

16. In combination,
first, second, third, and fourth sources each arranged to supply frequency modulated signals substantially of equal length and occurring at regularly spaced intervals,
each signal supplied by said first source beginning after the end of signals supplied by said second and third sources and before the end of a signal supplied by said fourth source,
each signal supplied by said second source beginning after the end of signals supplied by said third and fourth sources and before the end of a signal supplied by said first source,
each signal supplied by said third source beginning after the end of signals supplied by said fourth and first sources and before the end of a signal supplied by said second source,
each signal supplied by said fourth source beginning after the end of signals supplied by said first and second sources and before the end of a signal supplied by said third source,
whereby said frequency modulated signals are sequentially supplied by said sources in time overlapping relationship,
a 4 x 2 switcher coupled to said sources for providing a first output signal including only the signals supplied by said first and third sources and a second output signal including only the signals supplied by said second and fourth sources,
a first 2 x 1 switcher coupled to said 4 x 2 switcher for combining said first and second output signals into a continuous frequency modulated signal with the switching of said first 2 x 1 switcher being timed to occur during said overlaps,
a second 2 x 1 switcher coupled to said 4 x 2 switcher for combining said first and second output signals into a second continuous frequency modulated signal with the switching of said second 2 x 1 switcher being delayed to occur during said overlaps at a different time than that of said first 2 x 1 switcher,
a first frequency demodulator coupled to said first 2 x 1 switcher for translating said first continuous signal into a first demodulated signal,
a second frequency demodulator coupled to said second 2 x 1 switcher for translating said second continuous signal into a second demodulated signal, said first and second demodulated signals being substantially identical except that transients in said second demodulated signal due to random phase relationships introduced by the switching of said second 2 x 1 switcher are delayed in time with respect to transients in said first demodulated signal due to random phase relationships introduced by the switching of said first 2 x 1 switcher, an output switching means coupled to said demodulators and operated to pass to an output only said second demodulated signal until after the occurrence of a transient in said first demodulated signal and before the occurrence of the next transient in said second demodulated signal at which time said output switching means is operated to pass only said first demodulated signal to said output, said output switching means being thereafter operated to pass only said first demodulated signal until after the occurrence of said next transient in said second demodulated signal and before the occurrence of the next transient in said first demodulated signal at which time said output switching means is operated to pass only said second demodulated signal to said output, whereby said output switching means produces a continuous demodulated output signal unaffected by said transients.

17. A combination as claimed in claim 16, and wherein said sources each correspond to one of the magnetic head assemblies in a four-head, transverse scan magnetic tape signal recorder-reproducer.

18. In a multi-head signal recorder and reproducer which upon reproduction produces a plurality of sequentially occurring, overlapping frequency modulated signals, first means including a time delay circuit for combining said plurality of signals into a first and second continuous frequency modulated signal having the same information content but differing in displacement in distortion due to the action of said first means and second means for combining said first and second continuous signals into a single continuous demodulated output signal so that the appearance of said distortions in said output signal due to the operation of said combining means is minimized.

References Cited

UNITED STATES PATENTS

| | | | |
|---|---|---|---|
| 2,957,953 | 10/1960 | Woodward | 179—100.2 |
| 3,050,594 | 8/1965 | Bick et al. | 179—100.2 |

BERNARD KONICK, *Primary Examiner.*

CHESTER L. JUSTUS, *Examiner.*

L. G. KURLAND, R. A. FARLEY, *Assistant Examiners.*